US005422186A

United States Patent [19]

Biggeleben et al.

[11] Patent Number: 5,422,186

[45] Date of Patent: Jun. 6, 1995

[54] COMPOSITIONS CONTAINING MIXTURES OF AQUEOUS POLYMER DISPERSIONS AND TEXTILE AND LEATHER SUBSTRATES COATED THEREWITH

[75] Inventors: Eberhard Biggeleben, Leverkusen; Thomas Münzmay, Dormagen, both of Germany

[73] Assignee: Bayer Aktiengesellschaft, Leverkusen, Germany

[21] Appl. No.: 701,254

[22] Filed: May 16, 1991

[30] Foreign Application Priority Data

May 24, 1990 [DE] Germany ........................ 40 16 713.5

[51] Int. Cl.[6] ........................ C09D 175/04; C09D 5/00

[52] U.S. Cl. .............................. 428/423.3; 428/423.1; 428/904; 528/44; 528/48; 528/49; 528/50; 528/51; 524/839; 524/840

[58] Field of Search ................. 428/423.1; 528/44, 48, 528/49, 50, 51; 524/267, 839, 840

[56] References Cited

U.S. PATENT DOCUMENTS 3,479,310 11/1969 Dieterich et al. .................. 260/29.2
4,203,883 5/1980 Hangauer, Jr. .................. 428/423.1
4,408,008 10/1983 Markusch ............................ 524/591
4,829,122 5/1989 Pedain et al. ....................... 524/591
4,880,673 11/1989 Tork et al. .......................... 427/412

FOREIGN PATENT DOCUMENTS 1584865 10/1977 United Kingdom .

*Primary Examiner*—Patrick J. Ryan
*Assistant Examiner*—Richard P. Weisberger
*Attorney, Agent, or Firm*—Joseph C. Gil; Thomas W. Roy; Richard E. L. Henderson

[57] ABSTRACT

The present invention relates to coating compositions which are suitable for preparing matt coatings and contain A) an aqueous polymer dispersion which is capable of forming films at temperatures below 70° C. and B) an aqueous polyurethane polyurea dispersion which is not film forming below 70° C. and preferably has an average particle diameter above 350 nm, preferably from 500 to 1000 nm.

The present invention is also directed to textile or leather substrates coated with these coating compositions.

9 Claims, No Drawings

COMPOSITIONS CONTAINING MIXTURES OF AQUEOUS POLYMER DISPERSIONS AND TEXTILE AND LEATHER SUBSTRATES COATED THEREWITH

BACKGROUND OF THE INVENTION

1. Field of the Invention

The present invention relates to coating compositions containing a polymer dispersion which is capable of forming films at temperatures below 70° C. and a polyurethane polyurea dispersion which is not film forming at temperatures below 70° C., and to textile or leather substrates coated with these coating compositions.

2. Description of the Prior Art

The film forming polymer latices used for the preparation of coatings on any substrates, e.g., leather or textiles, include polymer latices from the classes of polyacrylates, polybutadienes, polyurethanes, etc. These polymer latices generally give rise to polymer films with a high gloss. This high gloss, which is desirable for some purposes, is undesirable for other purposes, e.g. for upholstery leather. In such cases, so-called matting agents are added to the polymer latices. The matting agents used are finely divided mineral substances such as silica or silicates. Coatings which have been matted with such inorganic materials are subject to so-called chalking when exposed to light in combination with moist heat, In addition, they harden the polymer film and often produce so-called grey fracture when the coated materials are stretched or milled.

It is an object of the present invention to provide coating compositions which provide an excellent matting effect and do not have the above-mentioned disadvantages of inorganic matting agents.

It has now been found that this object may be achieved in accordance with the present invention by the use of the mixtures described below.

SUMMARY OF THE INVENTION

The present invention relates to coating compositions which are suitable for preparing matt coatings and contain A) an aqueous polymer dispersion which is capable of forming films at temperatures below 70° C. and B) an aqueous polyurethane polyurea dispersion which is not film forming below 70° C. and preferably has an average particle diameter above 350 nm, preferably from 500 to 1000 nm.

The present invention is also directed to textile or leather substrates coated with these coating compositions.

DETAILED DESCRIPTION OF THE INVENTION

Coatings prepared from the mixtures according to the present invention unexpectedly produce an excellent matting effect.

Any aqueous polymer dispersions which are film forming below 70° C. may be used as component A), preferably aqueous polyurethane dispersions. The preparation of these aqueous dispersions is known and may be carried out according to "Die Angewandte Makromolekulare Chemie" 26 (1972), 85–106, or "Progress in Organic Coatings" 9 (1981), 281–340. Aqueous dispersions of this type may also be obtained according to the teachings of DE-AS 1 495 745, DE-OS 2 645 779 and U.S. Pat. Nos. 3,479,310 and 4,829,122, both of which are herein incorporated by reference.

The polymers which are film-forming below 70° C. also include latices based on natural or synthetic rubber, polybutadiene, poly-2-chlorobutadiene, polyethylene or polypropylene or copolymers of vinyl monomers such as acrylic or methacrylic acid esters, acrylonitrile, styrene or substituted styrenes, butadiene, isoprene or unsaturated polycarboxylic acids such as maleic acid. The preparation of such aqueous dispersions may be carried out by known processes as described, for example, in Houben-Weyl, "Methoden der organischen Chemie", Volume 14/1 and Volume E 20/2, pages 689–1255 or in F. Hölscher, Dispersionen synthetischer Hochpolymerer I, pages 43–117, Springer-Verlag Berlin 1969. Such aqueous dispersions suitable for use as component A) may also be obtained by, for example, the teaching according to DE-AS 36 10 576 (U.S. Pat. No. 4,880,673, herein incorporated by reference).

Starting compounds used for the preparation of the aqueous polyurethane polyurea dispersions B) according to the invention which are not film forming below 70° C. are prepared from isocyanate components a) which are known in polyurethane chemistry; relatively high molecular weight polyhydroxy compounds b), preferably polyhydroxy-polyesters, -polycarbonates or -polyethers, having a molecular weight of 400 to 5000, preferably 800 to 2500; low molecular weight OH functional chain lengthening agents c) having a molecular weight of 18 to 399 and containing at least two isocyanate reactive hydrogen atoms; and NH functional compounds d) having an average NH functionality greater than 1, preferably 2 to 3.

Particularly preferred OH functional chain lengthening agents c) include low molecular weight diols such as 1,2-ethanediol, 1,4-butanediol, 1,6-hexanediol and higher homologues; cycloaliphatic diols such as 1,4-dihydroxymethylcyclohexane; and low molecular weight ethoxylation and/or propoxylation products of aromatic diols such as bis-(2-hydroxyethyl)-hydroquinone and 2,2'-propylidene-bis-(p-phenyleneoxy)-di-omega-propanol-2.

Particularly preferred NH functional compounds d) include aliphatic or cycloaliphatic polyamines such as 1,2-ethanediamine, 1,6-hexamethylenediamine, 1-amino-3,3,5-trimethyl-5-aminomethyl-cyclohexane (isophorone diamine), piperazine and diethylene triamine; and aromatic polyamines and mixtures of aromatic polyamines having an NH functionality of 2 to 3 such as 2,4- and 2,6-toluenediamine, 1,2-, 1,3-, and 1,4-diaminobenzene, mixtures of 1,3-diamino-2,6-diethyl-4-methylbenzene and 1,3-diamino-4,6-diethyl-2-methylbenzene; polyamines and polyamine mixtures obtained by acid condensation of aldehydes such as formaldehyde or ketones such as acetone with aniline or substituted anilines, e.g., 4,4'-, 2,4'- and 2,2'-diamino-diphenylmethane and higher functional condensation products. The NH functional compounds d) used may also contain a portion of compounds which are monofunctional in isocyanate addition reactions such as ammonia, ethylamine, butylamine, dibutylamine, aniline, ethanolamine or diethanolamine. Mixtures of the compounds exemplified above may also be used according to the invention.

Other starting compounds for the preparation of the aqueous polyurethane polyurea dispersions B) according to the invention which are not film forming below 70° C. include ionic compounds e) which contain at least one carboxylate or sulphonate group or a group capable of conversion into such a group in addition to an isocyanate reactive group. Other starting compounds optionally used include compounds having at least one isocyanate reactive group and containing ethylene oxide units arranged in terminal positions and/or lateral positions within a polyether chain.

Examples of polyisocyanates which are suitable for use as isocyanate component a) include aliphatic, cycloaliphatic, araliphatic and aromatic polyisocyanates such as those described e.g. by W. Siefken in Justus Liebigs Annalen der Chemie, 562, pages 75–136. Aliphatic, cycloaliphatic and araliphatic diisocyanates are preferred and include 1,6-hexamethylene diisocyanate, 1,4-diisocyanatocyclohexane, 1-isocyanato-3,3,5-trimethyl-5-isocyanatomethyl-cyclohexane (isophorone diisocyanate), 4,4'-diisocyanato-dicyclohexylmethane and xylylene diisocyanate.

The quantities of starting compounds a) to e) are selected to provide a molar ratio of isocyanate reactive groups in the component b) to the sum of isocyanate reactive groups in the components c) and d) of 1:1.5 to 1:20, preferably 1:1.5 to 1:12.5, and to provide an equivalent ratio of isocyanate groups of component a) to the sum of isocyanate reactive groups of components b) to e) of 0.8:1 to 1.8:1, preferably 0.95:1 to 1.5:1.

Preparation of the polyurethane polyurea dispersion B) is generally carried out by one of the following known processes:

1. The "acetone process", in which a prepolymer having isocyanate end groups is prepared solvent-free, dissolved in a suitable solvent and reacted in solution with a chain lengthening agent to produce a polyurethane. After the solution of the polyurethane has been mixed with water, the polyurethane dispersion is obtained by removal of the solvent by distillation.

2. The process for the preparation of polyurethane dispersions using blocked amines or hydrazines as chain lengthening agents described in DE-OS 27 25 589 (U.S. Pat. No. 4,829,122, herein incorporated by reference). In this process, a hydrophilic prepolymer having terminal isocyanate groups is mixed with at least partially blocked amines or hydrazines in the absence of water, and water is then added to the resulting mixture. The previously blocked amine or hydrazine is liberated and reacts as a chain lengthening agent for the prepolymer. Although aromatic diisocyanates may be used for the formation of the prepolymers having terminal isocyanate groups, prepolymers having aliphatically and/or cycloaliphatically bound NCO groups are preferred.

3. The so-called "solvent-free dispersion process" wherein the terminal isocyanate groups of the hydrophilic prepolymer are converted into acylated amines by reaction with urea, ammonia or other suitable compounds and these acylated amines are converted into methylol groups by reaction with formaldehyde or similarly reacting compounds before, during or after the addition of water. The methylol groups are condensed by heating with elimination of water to form the polyurethane. This process may be carried out with any polyisocyanates, including aromatic polyisocyanates.

4. The process of dispersing hydrophilic prepolymers having terminal isocyanate groups in an aqueous medium followed by addition of the chain lengthening agent. The dispersion may be formed either by addition of the water to the prepolymer or by addition of the prepolymer to water. Prepolymers having aliphatically and/or cycloaliphatically bound, terminal isocyanate groups are particularly preferred when chain lengthening is carried out in an aqueous medium. When aromatically bound isocyanate end groups are used, these isocyanate groups are preferably blocked before the water is added.

According to the invention, dispersion of the polyurethanes may in principle be carried out by any process. These dispersion processes include dispersing without the use of solvents, e.g., by mixing the solvent-free polyurethanes with water in apparatus designed to produce high shear gradients. However, very small quantities of solvent may be used as plasticizers when the operation is carried out in the this apparatus as well as non-mechanical dispersing agents such as sound waves of extremely high frequency. Simple mixers (such as vessels with mechanical stirrers or so-called reflux mixers) may also be used if the polyurethanes are self-dispersible.

The aqueous polyurethane-polyurea dispersions B) used according to the invention have a solids content of 5 to 60% by weight and an average particle size of the dispersed phase of greater than 350 nm, preferably from 500 to 1000 nm. The average particle size depends upon the nature and quantity of the components a) to e), in particular the nature and quantity of hydrophilic component e).

The dispersions B) preferably contain ≧5% by weight, preferably about 7 to 15% by weight, of chemically incorporated —NH—CO—NH— groups.

Another preferred group of dispersions contains >15% by weight, preferably 16 to 45% by weight and more preferably 20 to 35% by weight, of chemically incorporated —X—CO—NH— groups wherein X=NH and/or O. The percentages are based on solids, i.e., the weight of the polyurethane polyurea excluding the weight of water.

The polymer dispersions A) are preferably mixed with the aqueous polyurethane polyurea dispersions B) in a ratio of 90:10 to 20:80, based on solids.

The auxiliary agents and additives which are known from coatings technology may be added to the coating mixture. Examples include agents to improve the handle, pigments, levelling agents, thickeners, stabilizers and inhibitors.

Coating compositions based on the mixtures according to the invention are suitable for coating any substrates, but are preferably used for coating flexible substrates, especially textile substrates or leather.

The coating compositions according to the invention may be worked up by known coating techniques such as application with doctor wipers, spraying, casting, plush application, roller application, etc. After the coating compositions have been applied they are dried, preferably either in a drier or, in the case of a continuous operation, in a drying channel.

The coating compositions according to the invention may be used both as primer, adhesive coat or finishing or top coat.

The quantities given in the following examples are parts by weight or percentages by weight unless otherwise indicated.

The average particle sizes were determined by laser correlation spectroscopy (Malvern Autosizer II, Malvern Inst. Limited).

EXAMPLE 1 (Component B)

140.0 g hexanediol polyadipate, OH number 135

93.4 g hexanediol/neopentyl glycol polyadipate, OH number 65, molar ratio of glycols 65:35

34.6 g dimethylolpropionic acid
256.7 g isophorone diisocyanate
20.4 g 1,4-butanediol
25.0 g ethylene diamine in 250 g of water
2.25 g 25% ammonia in water
10.3 g 25% ammonia in water
1250 g acetone
850 g water The polyester mixture and dimethylolpropionic acid were dehydrated in a water jet vacuum at 110° C. for 90 minutes. The isocyanate component was added at 90° C. After 1 hour, the isocyanate content was 10.8% (theoretical 11.1%). After the addition of 1,4-butanediol, the reaction mixture was kept at this temperature for a further 3 hours. The isocyanate content at the end of this time was 8.5% (theoretical 8.6%). The highly viscous prepolymer was diluted with 1250 g of cold acetone and then 25.0 g of ethylene diamine in 250 g of water and 2.25 g of 25% ammonia solution were stirred into the acetonic solution at a mixing temperature of about 50° C. The second quantity of ammonia was added after 10 minutes and the reaction mixture was then dispersed with 850 g of water. After removal of the solvent by vacuum distillation, a dispersion having the following data was obtained:

Average particle size: 780 nm
Solids content: 36.5%
Outflow viscosity (DIN cup 4 mm nozzle): 17 s.

EXAMPLE 2 (Component B)

170.0 g hexanediol/neopentyl glycol polyadipate, OH number 65, molar ratio of glycols 65:35
26.8 g dimethylolpropionic acid
266.4 g isophorone diisocyanate*
36.0 g 1,4-butanediol
60.4 g 70:30 mixture of 1,3-diamino-2,6-diethyl-4-methyl-benzene and 1,3-diamino-4,6-diethyl-2-methylbenzyl
20.2 g triethylamine
1000 g acetone
880 g water The hexanediol/neopentyl glycol polyadipate and dimethylolpropionic acid were dehydrated in a water jet vacuum at 110° C. for 90 minutes. The isocyanate component was added at 90° C. After 2 hours the isocyanate content was 16.1% (theoretical 16.3%). After the addition of 1,4-butanediol, the temperature was maintained at this level for a further 2 hours. The isocyanate content at the end of this time was 8.1% (theoretical 8.4%). The highly viscous prepolymer was diluted with 900 g of cold acetone and 60.4 g of a 70:30 mixture of 1,3-diamino-2,6-diethyl-4-methylbenzene and 1,3-diamino-4,6-diethyl-2-methylbenzene in 100 g of acetone were added at a mixing temperature of about 50° C. After 45 minutes at 55° C., 20.2 g of triethylamine were added and the reaction mixture was dispersed 10 minutes later with 880 g of water. After removal of the solvent by vacuum distillation, a dispersion having the following data was obtained:

Average particle size: 700 nm
Solids content: 44.3%
Outflow viscosity (DIN cup 4 mm nozzle): 35 s.

*) Component B) according to the invention was also obtained by completely or partly replacing isophorone diisocyanate with hexamethylene diisocyanate and 4,4'-diisocyanato-dicyclohexyl methane.

EXAMPLE 3 (Component B)

170.0 g hexanediol/neopentyl glycol polyadipate, OH number 65, molar ratio of glycols 65:35
26.8 g dimethylolpropionic acid
266.4 g isophorone diisocyanate
36.0 g 1,4-butanediol
43.9 g 70:30 mixture of 1,3-diamino-2,6-diethyl-4-methylbenzene and 1,3-diamino-4,6-diethyl-2-methylbenzene
6.3 g diethylene triamine
20.2 g triethylamine
1000 g acetone
880 g water The hexanediol/neopentyl glycol adipate and dimethylolpropionic acid were dehydrated in a water jet vacuum at 110° C. for 90 minutes. The isocyanate component was added at 90° C. After 2 hours the isocyanate content was 16.1% (theoretical 16.3%). After the addition of 1,4-butanediol, the temperature was kept at this level for a further 2 hours. The isocyanate content at the end of this time was 8.1% (theoretical 8.4%). The highly viscous prepolymer was diluted with 900 g of cold acetone and 43.9 g of a 70:30 mixture of 1,3-diamino-2,6-diethyl-4-methylbenzene and 1,3-diamino-4,6-diethyl-2-methylbenzene and 6.3 g of diethylene triamine in 100 g of acetone were added at a mixing temperature of about 50° C. 20.2 g of triethylamine were added after 45 minutes at 55° C., and the reaction mixture was dispersed 10 minutes later with 880 g of water. After removal of the solvent by vacuum distillation, a dispersion having the following data was obtained:

Average particle size: 550 nm
Solids content: 45.6%
Outflow viscosity (DIN cup 4 mm nozzle): 45 s.

EXAMPLE 4 (Component B)

170.0 g of hexanediol neopentylglycol polyadipate, OH number 65, molar ratio of glycols 65:35
26.8 g dimethylolpropionic acid
266.4 g isophorone diisocyanate
36.0 g 1,4-butanediol
45.3 g 70:30 mixture of 1,3-diamino-2,6-diethyl-4-methylbenzene and 1,3-diamino-4,6-diethyl-2-methylbenzene
10.7 g dibutylamine
20.2 g triethylamine
1000 g acetone
880 g water The hexanediol/neopentyl glycol polyadipate and dimethylolpropionic acid were dehydrated in a water jet vacuum at 110° C. for 90 minutes. The isocyanate component was added at 90° C. After 2 hours the isocyanate content was 16.1% (theoretical 16.3%). After addition of the 1,4-butanediol, the temperature was maintained at this level for a further 2 hours. The isocyanate content at the end of this time was 8.1% (theoretical 8.4%). The highly viscous prepolymer was diluted with 900 g of cold acetone and then 45.3 g of a 70:30 mixture of 1,3-diamino-2,6-diethyl-4-methylbenzene and 1,3-diamino-4,6-diethyl-2-methylbenzene and 10.7 g of dibutylamine in 100 g of acetone were added at a mixing temperature of about 50° C. 20.2 g of triethylamine were added after 45 minutes at 55° C. and the reaction mixture was dispersed with 880 g of water 10 minutes later. After removal of the solvent by vacuum distillation, a dispersion having the following data was obtained:

Average particle size: 630 nm
Solids content: 40.3%
Outflow viscosity (DIN cup 4 mm nozzle): 26 s.

EXAMPLE 5

150 g Component A), an approximately 30% aqueous anionic polyurethane dispersion having a Shore A hardness of 60 to 70 and based on a hexanediol polyadipate and an aliphatic diisocyanate (Bayderm Finish 60 UD, Bayer AG) and 250 g Component B), according to Example 2 were mixed with 450 g of demineralized water.

An approximately 20% mixture which was sprayable was obtained.

EXAMPLE 6 (Example of application)

A dressing having the following composition was applied to a full grained, after-tanned, greased, black pigmented calf leather which had been primed by known methods:

850 g of a mixture according to Example 5

30 g of a viscosity regulating levelling agent (BAYDERM additive VA, Bayer AG)

10 g of a commercial carbodiimide-based cross-linking agent (BAYDERM Fix PCL, Bayer AG)

100 g of demineralized water, by 1½ Cross spraying, drying and ironing.

A leather which was not hardened and had a very good matt surface without spots was obtained. It did not become grey when milled or stretched and did not chalk on exposure to light.

EXAMPLE 7

100 g Component A), a 35% aqueous acrylate dispersion having a Shore A hardness of about 65 and based on 15% by weight of acrylonitrile, 64% by weight of butyl acrylate, 3% by weight of methacrylic acid and 18% by weight of methyl methacrylate and 100 g Component B), according to Example 1 were mixed with 500 g of demineralized water. A sprayable, approximately 10% mixture was obtained.

EXAMPLE 8 (Example of application)

A dressing having the following composition 350 g of the mixture according to Example 7, 50 g of a levelling agent (EUDERM Filler VF, Bayer AG), 7.5 g of a commercial epoxide-based cross-linking agent (EUDERM Fix PMA, Bayer AG) and 100 g of demineralized water was sprayed onto leather which had been chrome tanned by the conventional method used for side leather, after-tanned, greased, primed and pigmented brown. The leather was then dried at 70° C. and embossed with a pore grain (80° C., 200 bar). A non-hardened leather with a deep matt surface was obtained. It did not become grey after milling and had no spots. No chalking occurred after exposure to light.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is suitable for preparing matt coatings and comprises A) 20 to 90% by weight, based on solids, of at least one aqueous polymer dispersion which is film forming below 70° C. and B) 10 to 80% by weight, based on solids, of at least one aqueous polyurethane polyurea dispersion which is not film forming below 70° C.

2. The composition of claim 1 wherein said polyurethane polyurea dispersion contains at least 15% by weight, based on solids, of chemically incorporated groups corresponding to the formula

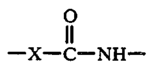

wherein X represents NH and/or O.

3. The composition of claim 1 wherein said polyurethane polyurea dispersion contains at least 5% by weight, based on solids, of chemically incorporated groups corresponding to the formula $\leftarrow$NH—CO—NH$\rightarrow$.

4. The composition of claim 1 wherein said polyurethane polyurea dispersion is based on an aromatic polyamine.

5. The composition of claim 1 wherein said polyurethane polyurea dispersion contains 2 to 50 milliequivalents, per 100 g of solids, of carboxylate and/or sulphonate groups which are chemically incorporated in the polymer and 0 to 5% by weight, based on solids, of ethylene oxide units present in polyether chains arranged in terminal and/or lateral positions.

6. The composition of claim 1 wherein said polyurethane polyurea dispersion has an average particle diameter of the dispersed phase of greater than 350 nm.

7. A composition which is suitable for preparing matt coatings and comprises A) 20 to 90% by weight, based on solids, of at least one aqueous polymer dispersion which is film forming below 70° C. and B) 10 to 80% by weight, based on solids, of an aqueous polyurethane polyurea dispersion which has an average particle diameter of the dispersed phase of greater than 350 nm, is not film forming below 70° C. and contains i) at least 15% by weight, based on solids, of chemically incorporated groups corresponding to the formula

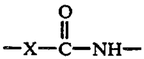

wherein X represents NH and/or O and ii) at least 5% by weight, based on sol ids, of chemically incorporated groups corresponding to the formula $\leftarrow$NH—CO—NH$\rightarrow$.

8. The composition of claim 8 wherein said polyurethane polyurea dispersion is based on an aromatic polyamine.

9. The composition of claim 8 wherein said polyurethane polyurea dispersion contains 2 to 50 milliequivalents, per 100 g of solids, of carboxylate and/or sulphonate groups which are chemically incorporated in the polymer and 0 to 5% by weight, based on solids, of ethylene oxide units present in polyether chains arranged in terminal and/or lateral positions.

* * * * *